United States Patent
Zeng et al.

(10) Patent No.: US 8,616,638 B2
(45) Date of Patent: Dec. 31, 2013

(54) INFANT CARRIER APPARATUS HAVING MULTIPLE SEATING POSITIONS

(75) Inventors: Xiang Yong Zeng, Central (HK); Nangui Bu, Central (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 311 days.

(21) Appl. No.: 13/004,339

(22) Filed: Jan. 11, 2011

(65) Prior Publication Data

US 2011/0175406 A1    Jul. 21, 2011

(30) Foreign Application Priority Data

Jan. 15, 2010 (CN) .......................... 2010 2 0003988

(51) Int. Cl.
*A47C 15/00* (2006.01)
(52) U.S. Cl.
USPC .................. 297/244; 297/183.1; 297/257
(58) Field of Classification Search
USPC .......... 297/19, 174 CS, 183.1, 244, 257, 340, 297/344.1
See application file for complete search history.

(56) References Cited

U.S. PATENT DOCUMENTS

| | | | | |
|---|---|---|---|---|
| 5,664,795 | A * | 9/1997 | Haung | 280/47.38 |
| 6,530,591 | B2 * | 3/2003 | Huang | 280/650 |
| 6,672,662 | B1 * | 1/2004 | Balk | 297/244 |
| 6,851,700 | B2 * | 2/2005 | Yoshie et al. | 280/642 |
| 2003/0030252 | A1 | 2/2003 | Huang | |
| 2007/0096434 | A1 * | 5/2007 | Haeggberg | 280/642 |
| 2010/0102535 | A1 * | 4/2010 | Zhong | 280/650 |

FOREIGN PATENT DOCUMENTS

| | | |
|---|---|---|
| CN | 201347116 Y | 12/2008 |
| EP | 2179908 A2 | 4/2010 |
| WO | 0220330 A1 | 3/2002 |

* cited by examiner

*Primary Examiner* — Philip Gabler
(74) *Attorney, Agent, or Firm* — David I. Roche; Baker & McKenzie LLP (57) ABSTRACT

An infant carrier apparatus having multiple seating positions comprises a support frame, a seat assembly connected with the support frame, and a backrest assembly including a backrest frame. The seat assembly includes a first seat frame and a second seat frame, and the second seat frame is operable to rotate relative to the first seat frame between an unfolded position and a folded position. The backrest frame is operable to rotate about a pivot axle relative to the support frame, wherein the folded position of the second seat frame is substantially parallel and adjacent to the backrest frame. Because the second seat frame can be conveniently folded to a disabled state adjacent to the backrest frame, erroneous use of the second seat frame can be prevented.

18 Claims, 7 Drawing Sheets

INFANT CARRIER APPARATUS HAVING MULTIPLE SEATING POSITIONS

CROSS-REFERENCE TO RELATED APPLICATION

This application claims priority to China Patent Application No. 201010002988.7 filed on Jan. 15, 2010.

BACKGROUND

1. Field of the Invention

The present invention relates to an infant carrier apparatus, and more particularly to an infant carrier apparatus having multiple seating positions.

2. Description of the Related Art

A stroller apparatus typically comprises a support frame provided with wheels, a seat assembly and a handle assembly. After a child is placed on the seat, the parent can use the handle to push the stroller in movement. In traditional strollers, the seat assembly is usually oriented toward the front of the stroller in its direction of displacement. Because the child does not face the parent when seated in the stroller, no interaction is permitted between the child and the parent.

To remedy the aforementioned deficiency, some current approaches propose a stroller structure that is provided with a seating space that can accommodate two seating configurations, for example facing forward and rearward. These strollers are usually provided with front and rear seats, and the orientation of the backrest can be adjusted back and forth. In this manner, the child can be seated either on the rear seat oriented rearward facing the parent, or on the front seat oriented forward opposite to the parent. While multiple seating configurations are permitted, these strollers require a larger space for assembling the front and rear seats, which may be detrimental to the storage of the stroller. Moreover, the adult may erroneously seat the child on the rear seat facing rearward while the stroller is actually configured for seating the child facing forward.

Therefore, there is a need for an infant carrier apparatus that can have multiple seating positions and address at least the foregoing issues.

SUMMARY

The present application describes The present application describes an infant carrier apparatus having multiple seating positions. The infant carrier apparatus can be conveniently and easily operated to adjust the orientation of the backrest and seat assemblies to suit the user's needs.

In one embodiment, the infant carrier apparatus comprises a support frame, a seat assembly connected with the support frame, and a backrest assembly including a backrest frame. The seat assembly includes a first seat frame and a second seat frame, and the second seat frame is operable to rotate relative to the first seat frame between an unfolded position and a folded position. The backrest frame is operable to rotate about a pivot axle relative to the support frame, wherein the folded position of the second seat frame is substantially parallel and adjacent to the backrest frame.

At least one advantage of the structures described herein is the ability to conveniently fold the second seat frame to a disabled state adjacent to the backrest frame, such that erroneous use of the second seat frame can be prevented.

DETAILED DESCRIPTION OF THE EMBODIMENTS

The present application describes an infant carrier apparatus having multiple seating positions. The infant carrier apparatus can be conveniently and easily operated to adjust the orientation of the backrest and seat assemblies to suit the user's needs. Examples of the infant carrier apparatus can include, without limitation, strollers, car seats, child swings, rockers, etc.

Figure 1:
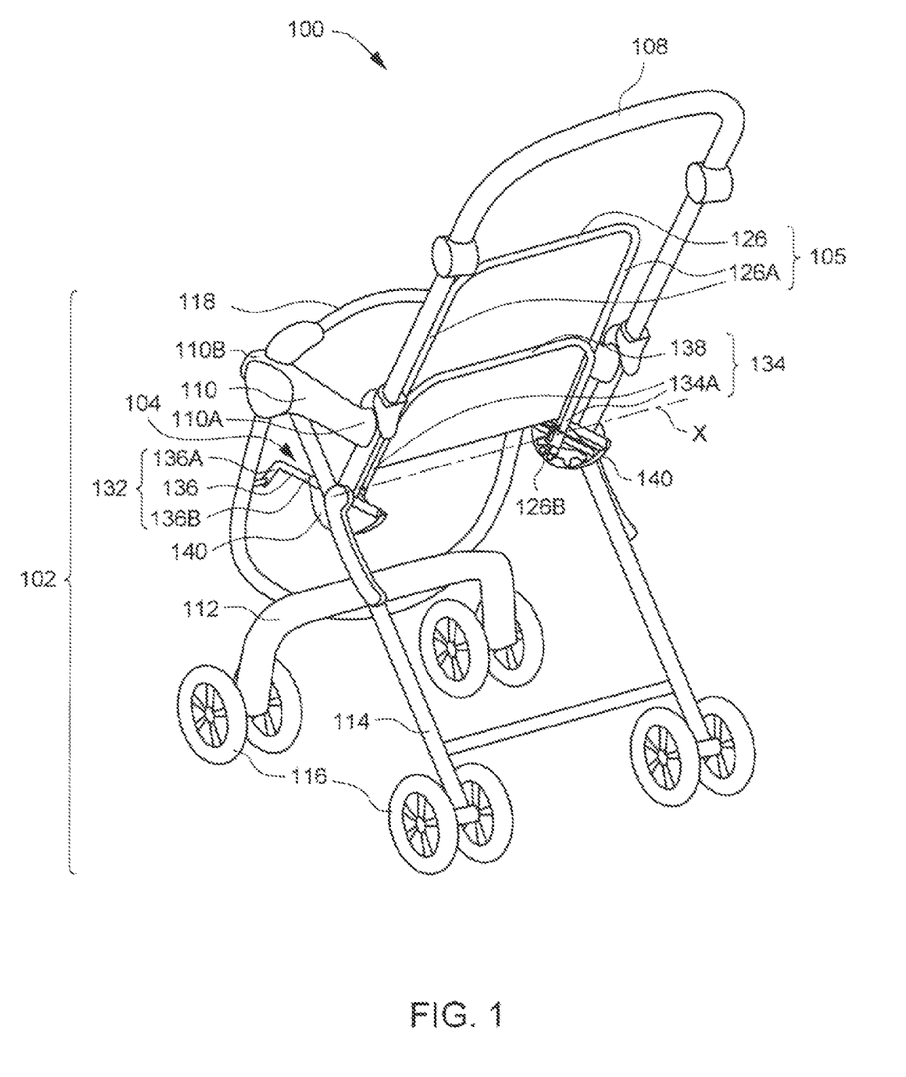
FIG. 1 is a schematic view illustrating one embodiment of an infant carrier apparatus.

FIG. 1 is a schematic view illustrating an embodiment of an infant carrier apparatus 100, which is exemplary a child stroller. The infant carrier apparatus 100 can include a support frame 102, a seat assembly 104 and a backrest assembly 105.

The support frame 102 can comprise a U-shaped push handle 108, two armrests 110, front legs 112, rear legs 114 and a plurality of wheels 116. In one embodiment, the push handle 108 can include two side segments respectively connected with the rear legs 114. Each of the armrests 110 can include a rear or first end 110A connected with one corresponding side segment of the push handle 108, and an opposite front or second end 110B respectively connected with upper ends of corresponding front and rear legs 112 and 114. A transverse bar 118 is also connected between the two armrests 110, and the wheels 118 are respectively provided at lower ends of the front and rear legs 112 and 114.

As shown in FIG. 1, the seat assembly 104 is assembled with the support frame 102. In one embodiment, the seat assembly 104 can include a first seat frame 132 and second seat frame 134. The first seat frame 132 can be a front seat used for seating a child in a forward facing position, and the second seat frame 134 can be a rear seat for seating a child in a rearward facing position. Moreover, the first and second seat frames 132 and 134 can also include cushion members, fabrics and like soft materials (not shown) for providing comfortable seating.

In one embodiment, the first seat frame 132 can be exemplary formed from two support bars 136. The support bars 136 can have front ends 136A respectively connected with left and right sides of the support frame 102, and rear ends 136B respectively affixed with holder bases 140.

Figure 7:
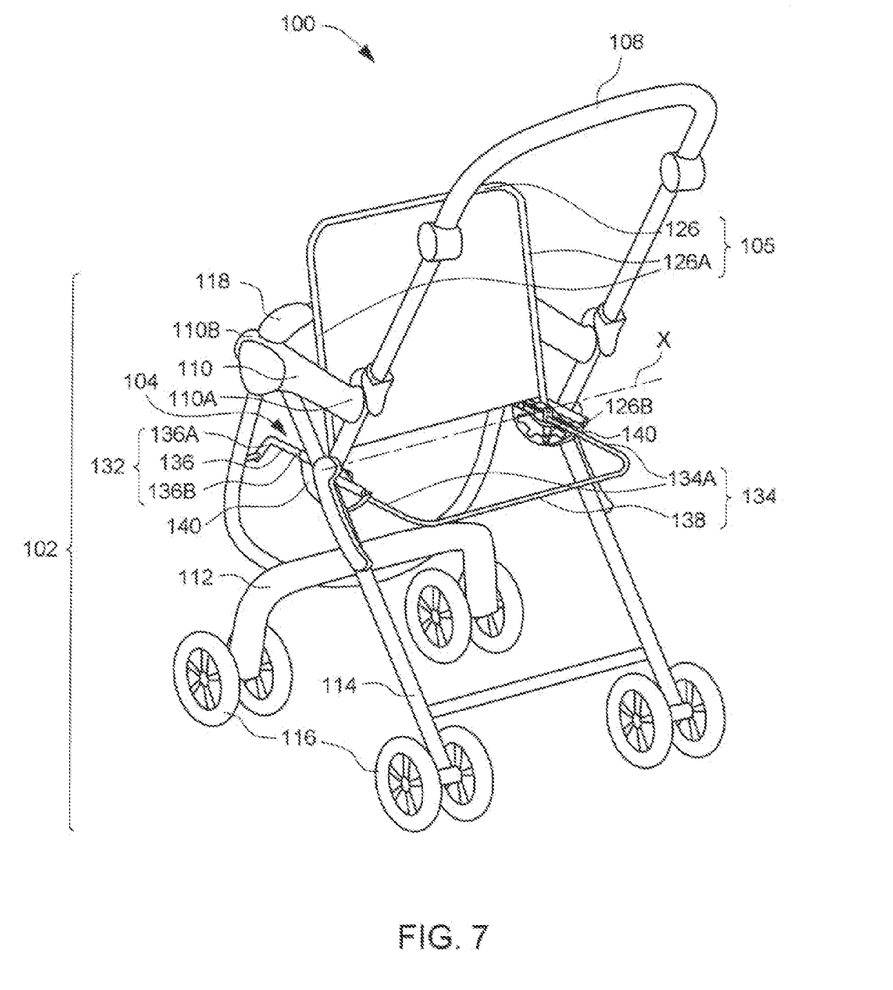
FIG. 7 is a schematic view illustrating the infant carrier apparatus in a configuration for seating a child facing rearward.

The second seat frame 134 can be formed from a U-shaped tubular member 138. Left and right side segments 134A of the second seat frame 134 can be pivotally coupled with the holder bases 140, respectively. The second seat frame 134 can thereby rotate about a pivot axis X for adjustment to a folded position adjacent to the backrest assembly 105 (as shown in FIG. 1), or to an unfolded position (as shown in FIG. 7) for seating a child facing rearward.

Referring again to FIG. 1, the backrest assembly 105 can include a backrest frame 126. The backrest frame 126 can be provided with a cushion, fabric envelop or like soft materials (not shown) to provide comfortable back support. In one embodiment, the backrest frame 126 can include a U-shaped tubular member that has left and right side segments 126A respectively coupled pivotally with the first seat frame 132. The backrest frame 126 can be thereby pivotally adjusted relative to the seat assembly 104 (in particular first seat frame 132) to different inclinations. For example, when the infant carrier apparatus 100 is turned to a forward facing configuration, the backrest frame 126 can be adjusted to a rearward inclined position (as shown in FIG. 1). When the infant carrier apparatus 100 is turned to a rearward facing configuration, the backrest frame 126 can be adjusted to a forward inclined position (as shown in FIG. 7). In addition, left and right side distal ends of the backrest frame 126 have engaging portions 126B that can respectively engage with the holder bases 140 to hold the backrest frame 126 at different inclinations.

Each of the holder bases 140 can be respectively affixed with the left and right sides of the support frame 102. The backrest frame 126 and the second seat frame 134 can be movably connected with the holder bases 140, respectively. In this manner, the backrest assembly 105 and the second seat frame 134 can be adjusted between a forward facing configuration and a rearward facing configuration.

Figure 2:
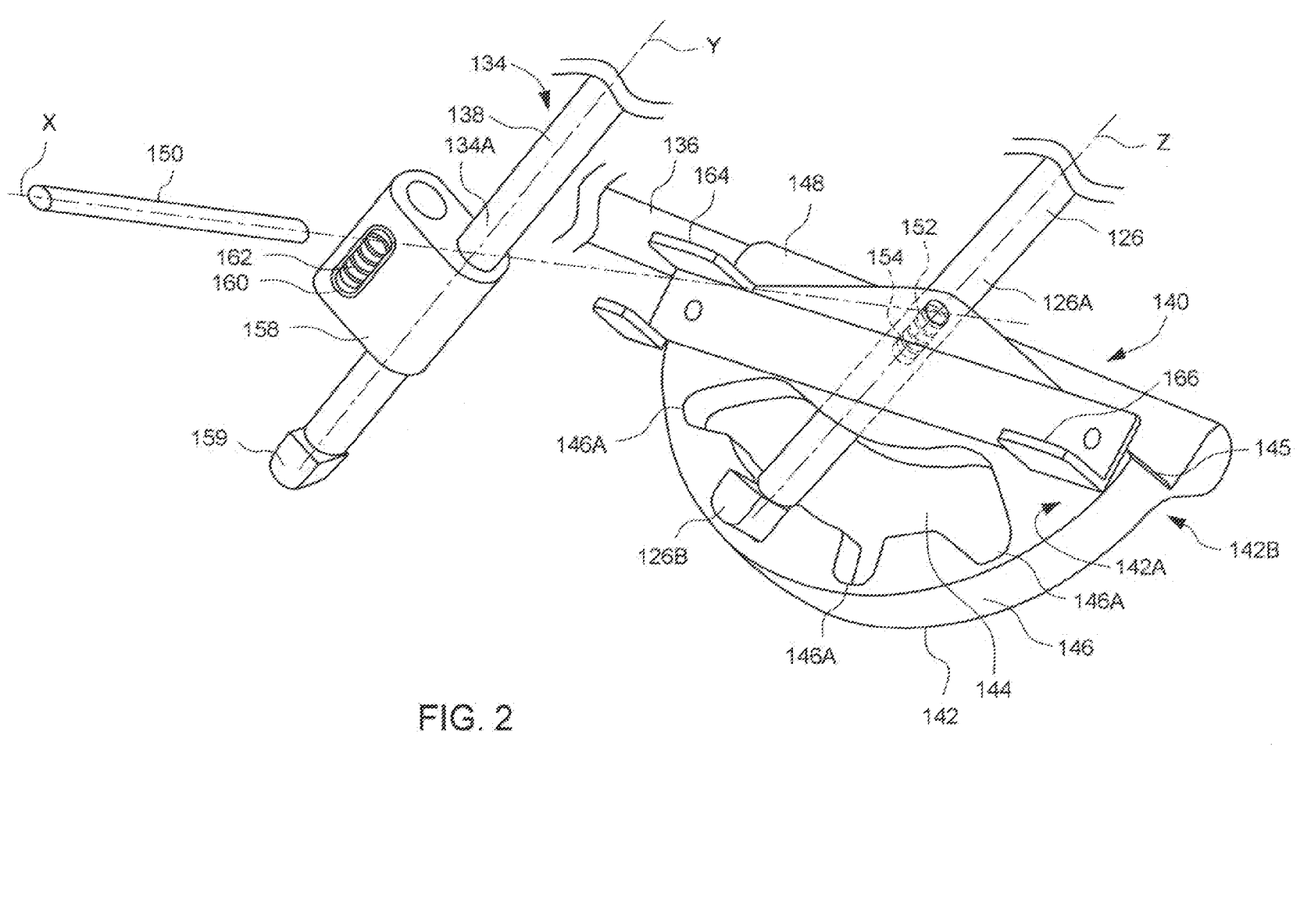
FIG. 2 is an exploded view illustrating how the backrest frame, second seat frame and holder base of the apparatus shown in FIG. 1 are assembled together.

FIG. 2 is an exploded view illustrating how the backrest frame 126, the second seat frame 134 and the holder base 140 can be assembled together. The holder base 140 can be formed from a generally half circular casing 142. The casing 142 includes a hollow interior 144 that may open on a first side surface 142A of the casing 142. The casing 142 can have an upper portion 145 and lower portion 146 that respectively delimit at least partially upper and lower sides of the hollow interior 144. The lower portion 146 can include a plurality of locking grooves 146A that are disposed at different radial directions relative to the rotation axis of the backrest frame 126. A second side surface 142B opposite to the first side surface 142A of the casing 142 can include a raised portion 148 through which one support bar 136 of the first seat frame 132 can be affixed.

One side segment 126A of the backrest frame 126 can be passed through the upper portion 145 into the hollow interior 144. A pivot axle 150 (such as rivet, pin and the like) can be passed through the side segment 126A and the casing 142 to pivotally connect the backrest frame 126 with the casing 142. The backrest frame 126 can thereby rotate about the pivot axis X defined by the pivot axle 150 relative to the first seat frame 132 and the holder base 140.

Referring again to FIG. 2, when the side segment 126A of the backrest frame 126 is connected through the hollow interior 144 of the casing 142, the engaging portion 126B at the distal end of the backrest frame 126 can extend laterally through the first side surface 142A outside the casing 142. Moreover, the side segment 126A of the backrest frame 126 includes an elongated guide slot 152 through which is passed the pivot axle 150. A spring element 154, assembled in the side segment 126A of the backrest frame 126, has a first end connected with the pivot axle 150 and a second end anchored with the side segment 126A. With the pivot axle 150 assembled through the guide slot 152, the backrest frame 126 can move parallel to its lengthwise axis Z relative to the holder base 140 in addition to rotating movements about the pivot axis X. Accordingly, once the backrest frame 126 is adjusted to a desired inclination, the engaging portion 126B can engage with one corresponding locking groove 146A to lock the backrest frame 126 in place.

Referring again to FIG. 2, the second seat frame 134 can be disposed adjacent to the first side surface 142A of the casing 142. The second seat frame 134 can include a coupling element 158, and a distal end of the second seat frame 134 can have an abuttal portion 159. In one embodiment, the coupling element 158 can be affixed with the second seat frame 134 via a fastener (for example screw). In alternate embodiments, the coupling element 158 can also be formed integral with the second seat frame 134. The coupling element 158 can be formed as a protruding housing having an elongated slot 160 that is positioned offset from the lengthwise axis Y of the second seat frame 134. The coupling element 158 can be positioned on the first side surface 142A of the holder base 140 with the pivot axle 150 passing through the guide slot 160 of the coupling element 158. In this manner, the second seat frame 134 can be pivotally coupled with the pivot axle 150 at an offset position. Moreover, the second seat frame 134 can move parallel to its lengthwise axis Y between a first or locked position, and a second or unlocked position.

A hollow interior of the coupling member 158 can also be provided with a spring element 162 having a first end connected with the pivot axle 150, and a second end affixed with the coupling member 158. The spring force exerted by the spring element 162 can bias the second seat frame 134 toward the first position at which the second seat frame 134 is locked in place and cannot be adjusted independently relative to the backrest frame 126. The locked state can be released by displacing the second seat frame 134 from the first to the second position. Once the second seat frame 134 is at the second position, rotation of the second seat frame 134 about the pivot axis X relative to the holder base 140 and the backrest frame 126 is permitted.

Figure 6:
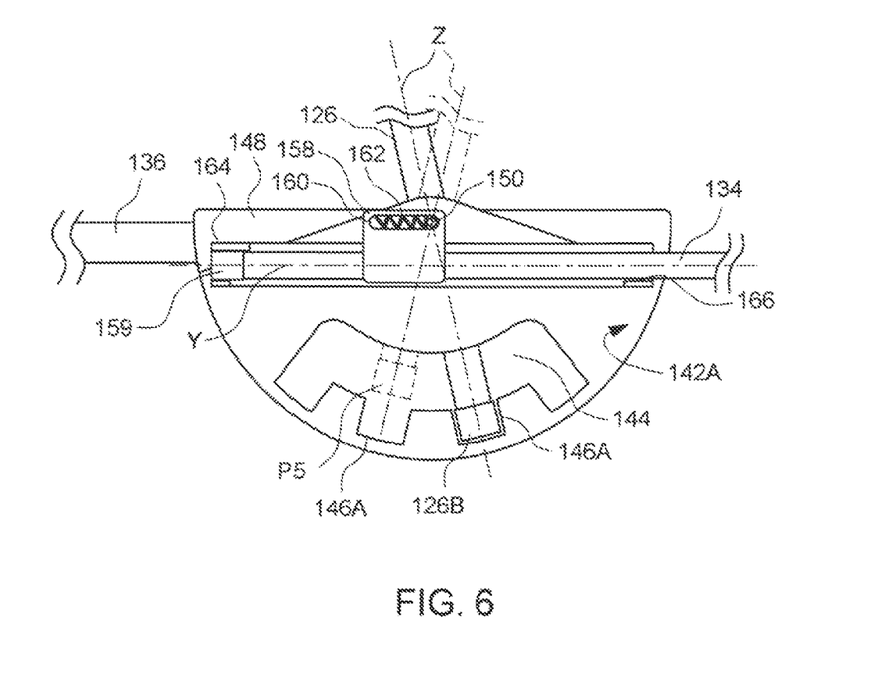

As shown in FIG. 2, the casing 142 can also include a retainer bracket 164 and a support bracket 166 respectively protruding from the first side surface 142A at opposite positions relative to the pivot axis X. More specifically, the retainer bracket 164 can be disposed proximate to the rotation path of the abuttal portion 159. When the second seat frame 134 is adjusted to an unfolded position (as shown in FIG. 6), the second seat frame 134 can lie substantially horizontal and contact with the support bracket 166. Moreover, the abuttal portion 159 of the second seat frame 134 can be urged to engage with the retainer bracket 164 by the spring action exerted by the spring element 162. Accordingly, the second seat frame 134 can be held in an unfolded state adapted to seat a child facing rearward.

Figure 3:
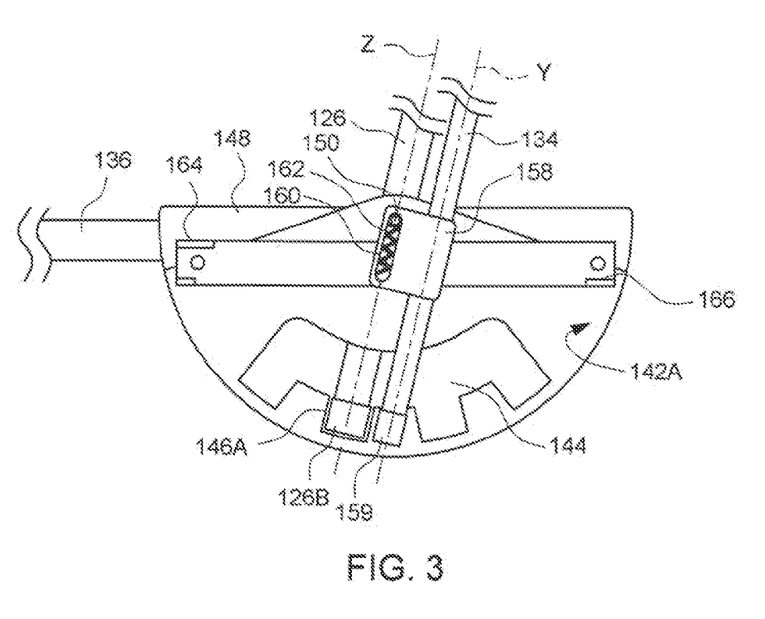
FIG. 3 is a schematic view illustrating a folded position of the second seat frame when the infant carrier apparatus is in a configuration for seating a child facing forward.

FIGS. 3 through 6 are schematic views illustrating exemplary adjustment of the backrest frame 126 and second seat frame 134. Referring to FIG. 3, the backrest frame 126 and second seat frame 134 are shown in a configuration in which the rearward-facing seating position is disabled (i.e., the infant carrier apparatus 100 is adapted to seat a child facing forward). In this configuration, the backrest frame 126 is inclined rearward, and the engaging portion 126B can engage with one locking groove 146A under the biasing action from the spring element 154 (as shown in FIG. 2). Accordingly, the backrest frame 126 can be securely held at the rearward inclined position. Moreover, the second seat frame 134 can be folded to a position adjacent and substantially parallel to a side of the backrest frame 126 and locked at the first position under the biasing action from the spring element 162. When the second seat frame 134 is in this first position, the engaging portion 126B of the backrest frame 126 extending outward from the first side surface 142A of the casing 142 creates blocking interference with the movement path of the second seat frame 134. In particular, the engaging portion 126B is in a position that can be in obstructive contact with the abuttal portion 159 to block rearward rotation of the second seat frame 134. Moreover, the upper portion of the backrest frame 126 (i.e., located above the pivot axis X) can also interfere with the upper portion of the second seat frame 134 (i.e., located above the pivot axis X) to block forward rotation of the second seat frame 134. Accordingly, the second seat frame 134 can be locked in the folded position adjacent to the backrest frame 126. Because the seating configuration facing rearward is disabled, accidental use of the rear seat can be effectively prevented.

Figure 4:
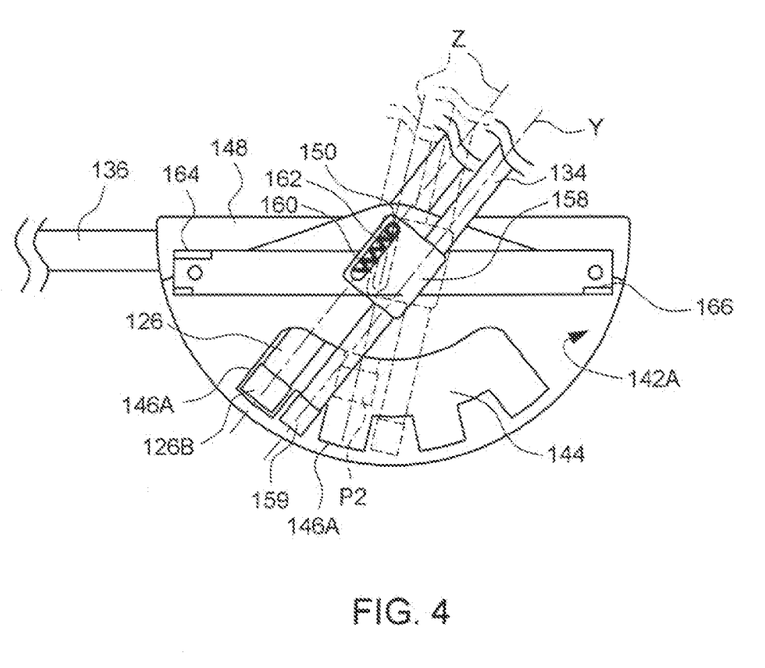
FIG. 4 is a schematic view illustrating the backrest frame adjusted to a rearward inclined position.
Figure 5:
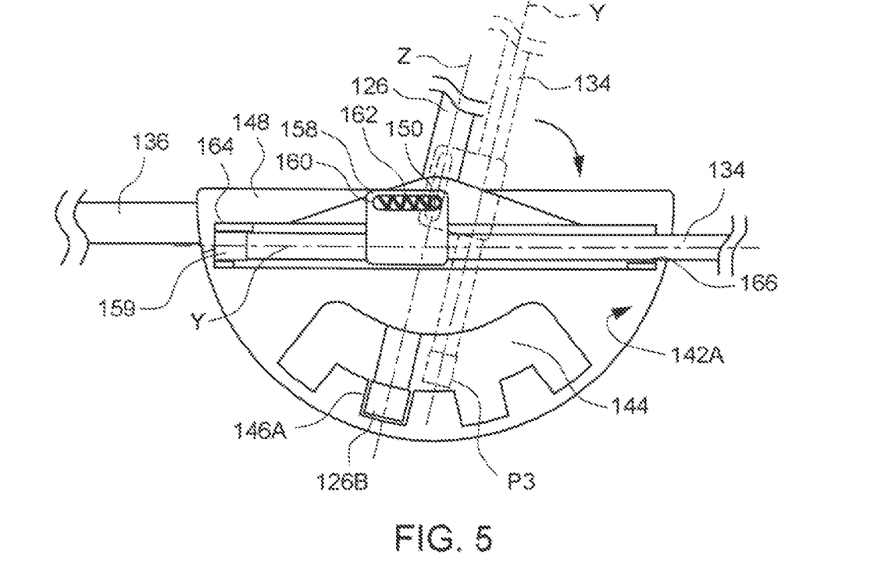
FIGS. 5 and 6 are schematic views illustrating how the second seat frame is adjusted from a folded position adjacent to the backrest frame to an unfolded position away from the backrest frame.

Referring to FIG. 4, when the backrest frame 126 is to be adjusted to a different rearward reclined position, the backrest frame 126 has to be pulled parallel to its lengthwise axis Z so as to disengage the engaging portion 126B from the locking groove 146A (the disengaged position P2 is shown with dashed lines). Once the engaging portion 126B is in the disengaged position P2, the spring element 154 (as shown in FIG. 2) is in a compressed state. The backrest frame 126 then can be rotated about the pivot axis X to a desired inclination. While the backrest frame 126 is adjusted, the second seat frame 134 can also be driven in synchronous movement: the upper portion of the backrest frame 126 can push on the second seat frame 134 when the backrest frame 126 rotates rearward, whereas the lower engaging portion 126B of the backrest frame 126 can push on the second seat frame 134 when the backrest frame 126 rotates forward. Accordingly, while the backrest frame 126 is rotated about the pivot axis X, the second seat frame 134 can be kept in the folded position adjacent and parallel to the backrest frame 126. Once the backrest frame 126 reaches the desired position, the spring element 154 can urge the engaging portion 126B to engage with the corresponding locking groove 146A for locking the backrest frame 126 in place (as shown in solid lines). In this manner, the second seat frame 134 can be held in a conveniently folded position that does not interfere with the rotation of the backrest when the forward-facing seating configuration is adjusted.

When the infant carrier apparatus 100 is to be adjusted to enable the seating configuration facing rearward, the backrest frame 126 and the second seat frame 134 have to be operated separately. More specifically, referring to FIG. 5, the second seat frame 134 first can be pulled parallel to the lengthwise axis Y from the position shown in FIG. 3 to the second position P3 shown in FIG. 5 with dashed lines. Once the second seat frame 134 reaches the second position P3, the second seat frame 134 and its abuttal portion 159 are positioned above and out of the blocking interference created by the engaging portion 126B of the backrest frame 126. The second seat frame 134 then can be rotated rearward about the pivot axis X until the second seat frame 134 contacts with the support bracket 166. It can be noted that as the second seat frame 134 rotates, the abuttal portion 159 can pass by the position of the engaging portion 126B. Once it contacts with the support bracket 166, the second seat frame 134 lies substantially horizontal. The biasing force exerted by the spring element 162 can then urge the abuttal portion 159 to slide parallel to the lengthwise axis Y and engage with the retainer bracket 164, whereby the second seat frame 134 can be securely held in the unfolded position (as shown in solid lines) away from the backrest frame 126 to enable the seating configuration facing rearward.

Next referring to FIG. 6, the backrest frame 126 can be pulled parallel to the lengthwise axis Z to a position P5 (shown with dashed lines) for disengaging the engaging portion 126B from the locking groove 146A, and then turned about the pivot axis X to a forward inclined position. Once the backrest frame 126 is properly adjusted, the spring element 154 can urge the engaging portion 126B to engage with the corresponding locking groove 146A to securely hold the backrest frame 126 in place (shown with solid lines). As illustrated in FIG. 7, the infant carrier apparatus 100 can be thereby turned to a configuration for seating a child facing rearward.

In case the infant carrier apparatus 100 is to be adjusted from the configuration shown in FIG. 7 to the seating configuration facing forward shown in FIG. 1, locking engagement between the backrest frame 126 and the holder base 140 first has to be unlocked. Then, the backrest frame 126 can be rotated about the pivot axis X from the forward inclined position to a rearward inclined position. Once properly adjusted, the backrest frame 126 can be urge into locking engagement with the holder base 140. Subsequently, the unfolded second seat frame 134 can be unlocked and rotated to its folded position parallel to the backrest frame 126 to disable the seating configuration facing rearward, as shown in FIG. 1.

Figure 8:
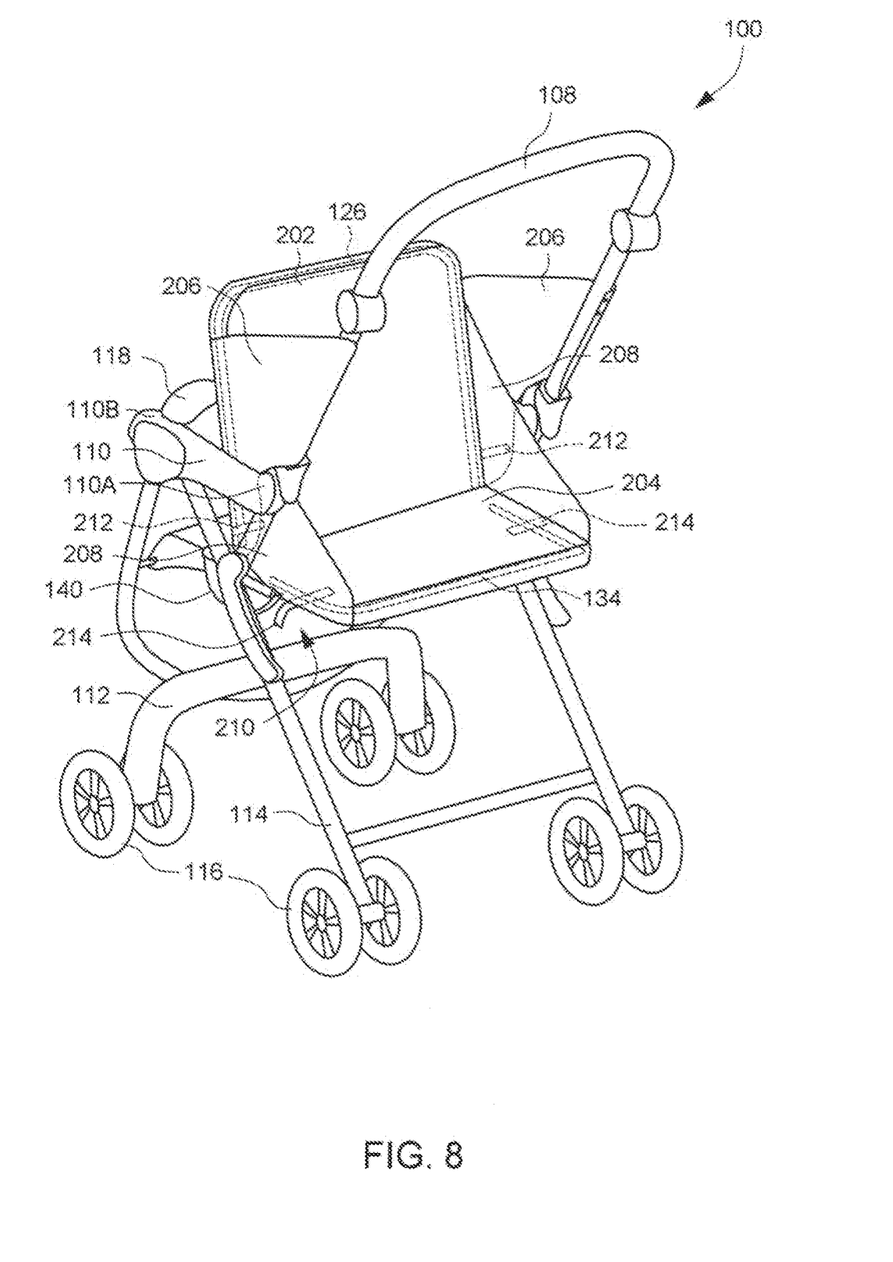
FIGS. 8 and 9 are schematic views illustrating the infant carrier apparatus provided with additional safety features.
Figure 9:
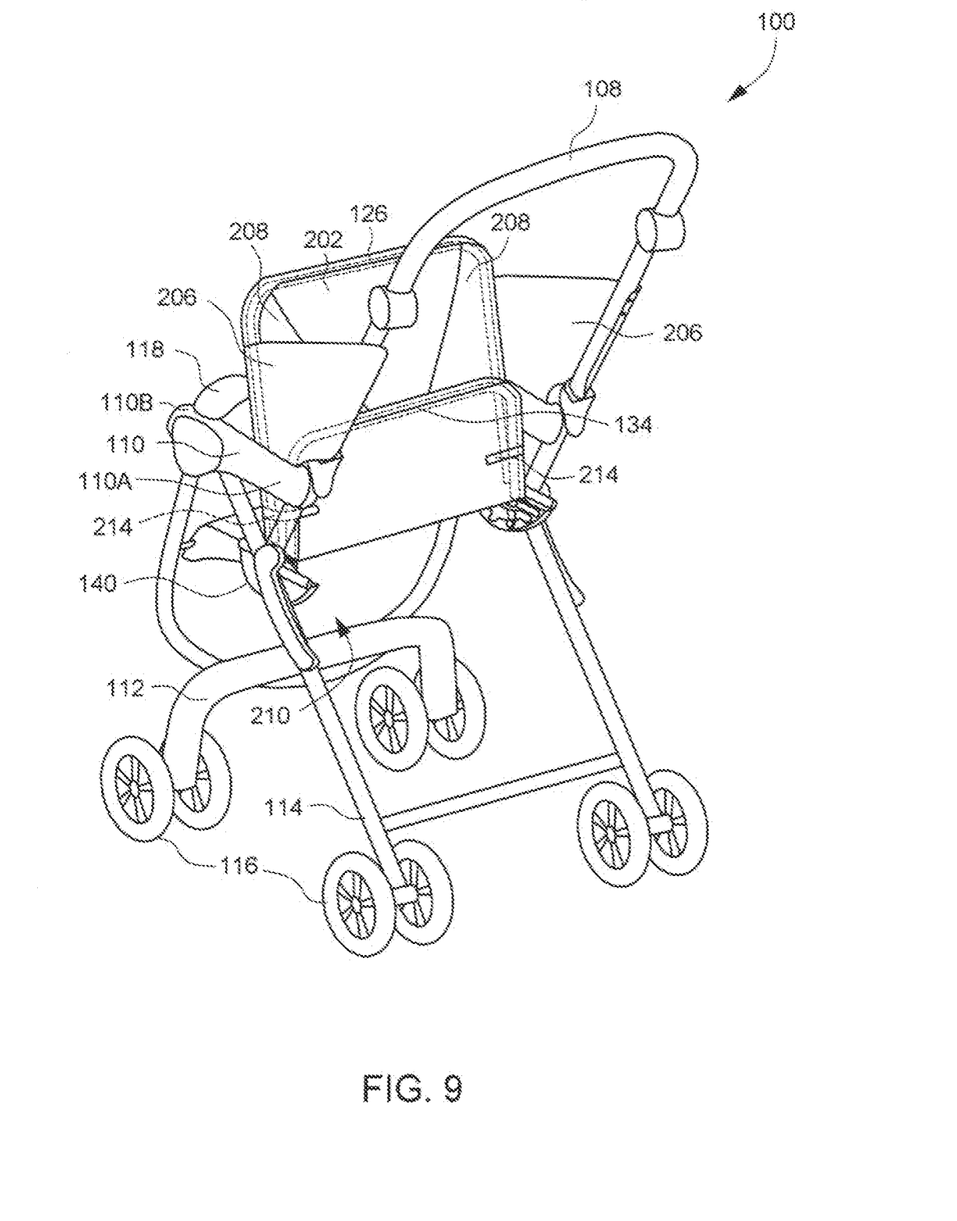

FIGS. 8 and 9 are schematic views illustrating additional safety features that may facilitate the seating configuration facing rearward. More specifically, FIG. 8 shows the infant carrier apparatus 100 with the second seat frame 134 unfolded for use, whereas FIG. 9 shows the same infant carrier apparatus 100 with the second seat frame 134 folded. As shown in FIG. 8, the backrest frame 126 and the second seat frame 134 can respectively incorporate cushion elements (for example, made of fabric, foamed material, etc.) so as to form a backrest member 202 and rear seat member 204.

The left and right side edges of the backrest member 202 can respectively include an outer side panel 206 and an inner side panel 208. In one embodiment, the outer and inner side panels 206 and 208 can be made of soft materials (such as fabric). Each of the outer side panels 206 can be connected between the backrest member 202 and the push handle 108. In particular, the outer side panel 206 can have a first edge attached with one side edge of the backrest member 202, and a second edge attached with the side segment of the push handle 108.

Each of the inner side panels 208 can be respectively connected with the side edges of the backrest member 202 and the rear seat member 204. More specifically, the joining region between the inner side panel 208 and the backrest member 202 can be adjacent to the joining region between the outer side panel 206 and the backrest member 202 on each of the left and right sides. When the rear seat member 204 receives the placement of a child, both the outer and inner side panels 206 and 208 can be used to provide lateral resting support.

In order to secure the folded position of the rear seat member 204 adjacent to the backrest member 202 (i.e., similar to the configuration shown in FIG. 1), an easily operated fastener 210 can be provided between the rear seat member 204 and the outer side panel 206. In one embodiment, the fastener 210 can use Velcro® tapes, including first and second fastener members 212 and 214. The first fastener member 212 (shown with dashed lines) can be provided on an inner side of each outer side panel 206, and the second fastener member 214 can be provided on a bottom of the rear seat 204. It is worth noting that rather than Velcro® tapes, other types of fasteners may also be suitable, such as buckle systems, hook fasteners, magnet fasteners, etc.

As shown in FIG. 8, when the seating configuration facing rearward is enabled, the rear seat member 204 is unfolded downward. The outer and inner side panels 206 and 208 are stretched out generally parallel on the left and right sides, and the inner side panels 208 respectively occlude the first fastener members 212.

As shown in FIG. 9, when it is not used, the rear seat member 204 can be folded to a position adjacent to the backrest member 202. In the folded position of the rear seat member 204, the inner side panels 208 can be folded upon the surface of the backrest 202. The inner side panels 208 can thereby lie substantially between the backrest member 202 and the rear seat member 204 to expose the first fastener member 212. The second fastener member 214 then can be wrapped around the side edge of the rear seat 204 and attached with the first fastener member 212. Accordingly, the rear seat member 204 can be fixedly attached in the folded position.

It will be appreciated that the safety features illustrated in FIGS. 8 and 9 can be suitable for use with the design described previously with reference to FIG. 2.

At least one advantage of the infant carrier apparatus described herein is the ability to operatively adjust the backrest and seat assemblies in an easy and convenient manner. When the first seat frame is used, the second seat frame can be conveniently folded adjacent to the backrest to disable the seating position facing rearward. Erroneous use of the second seat frame can be thereby prevented.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
   a support frame;
   a seat assembly connected with the support frame, wherein the seat assembly includes a first seat frame and a second seat frame respectively providing tow different seating positions, and the second seat frame is operable to rotate relative to the first seat frame between an unfolded position and a folded position; and
   a backrest assembly including a backrest frame, wherein the backrest frame is operable to rotate about a pivot axle relative to the support frame;
   wherein the folded position of the second seat frame is substantially parallel and adjacent to the backrest frame, and the backrest frame is operable to create a blocking interference with the second seat frame that holds the second seat frame in the folded position a displacement of the second seat frame from the folded position toward the unfolded position being blocked by the backrest frame, and wherein the second seat frame has a lengthwise axis along which the second seat frame is movable between a first position where the second seat frame is in blocking interference with the backrest frame, and a second position where the second seat frame is out of blocking interference with the backrest frame.

2. The apparatus according to claim 1, wherein the second seat frame is operable to rotate about the pivot axle of the backrest frame, and is rotatable along with the backrest frame during adjustment of the backrest frame.

3. The apparatus according to claim 2, wherein the pivot axle passes through a side segment of the backrest frame, and the second seat frame is pivotally coupled with the pivot axle at an offset position via a coupling element.

4. The apparatus according to claim 1, wherein the backrest frame includes an engaging portion that is movable to engage with a holder base to hold the backrest frame at a given inclination.

5. The apparatus according to claim 4, wherein the second seat frame is locked by the holder base when the second seat frame is in the unfolded position.

6. The apparatus according to claim 4, wherein the backrest frame has a lengthwise axis along which the backrest frame is movable to either engage the engaging portion with the holder base, or disengage the engaging portion from the holder base.

7. The apparatus according to claim 6, wherein the backrest frame further includes a first spring element operable to bias the engaging portion into locking engagement with the holder base.

8. The apparatus according to claim 1, and wherein the second seat frame includes a second spring element operable to bias the second seat frame toward the first position.

9. The apparatus according to claim 1, wherein the backrest frame has a distal end that is in blocking interference with the second seat frame when the second seat frame is in the first position.

10. The apparatus according to claim 9, wherein while the backrest frame is locked at a given inclination, a displacement of the second seat frame from the first position to the second position moves the second seat frame out of the blocking interference by the distal end of the backrest frame, and subsequently permits rotation of the second seat frame relative to the backrest frame.

11. The apparatus according to claim 1, wherein the first seat frame forms a front seat, and the second seat frame forms a rear seat.

12. The apparatus according to claim 1, wherein the backrest frame and the second seat frame respectively include a cushion element to form a backrest member and a rear seat member.

13. The apparatus according to claim 12, wherein the support frame includes a push handle, and an outer side panel is connected between a side edge of the backrest member and a side segment of the push handle.

14. The apparatus according to claim 13, wherein an inner side panel is connected between a side edge of the backrest member and a corresponding side edge of the rear seat member.

15. The apparatus according to claim 14, wherein the rear seat member when in the folded position is retained adjacent to the backrest member via a fastener.

16. The apparatus according to claim 15, wherein the fastener includes a first fastener member provided on the outer side panel, and a second fastener member provided on the rear seat member and adapted to attach with the first fastener member.

17. The apparatus according to claim 16, wherein when the rear seat member is in the unfolded position, the outer and inner side panels are stretched out generally parallel, and the inner side panel occludes the first fastener member.

18. The apparatus according to claim 16, wherein when the rear seat member is in the folded position adjacent to the backrest member, the inner side panel is folded between the backrest member and the rear seat member and the second fastener member wraps around the side edge of the rear seat member to attach with the first fastener member.

* * * * *